Nov. 23, 1954  A. K. McKECHNIE  2,694,889
DISK HARROW
Filed Aug. 24, 1950  3 Sheets-Sheet 1

Inventor
ALEXANDER K. MCKECHNIE
By: Fetherstonhaugh & Co.
Att'ys.

Nov. 23, 1954  A. K. McKECHNIE  2,694,889
DISK HARROW
Filed Aug. 24, 1950  3 Sheets-Sheet 2

Inventor
ALEXANDER K. McKECHNIE
By: Fetherstonhaugh & Co
Att'ys.

Nov. 23, 1954 A. K. McKECHNIE 2,694,889
DISK HARROW
Filed Aug. 24, 1950 3 Sheets-Sheet 3
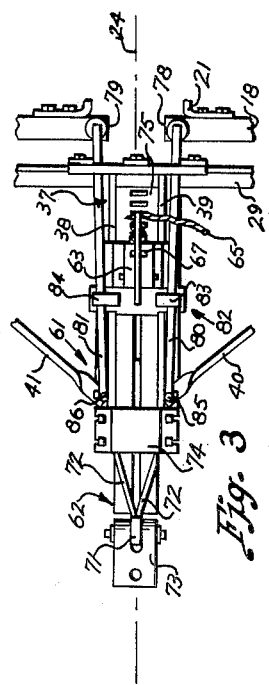
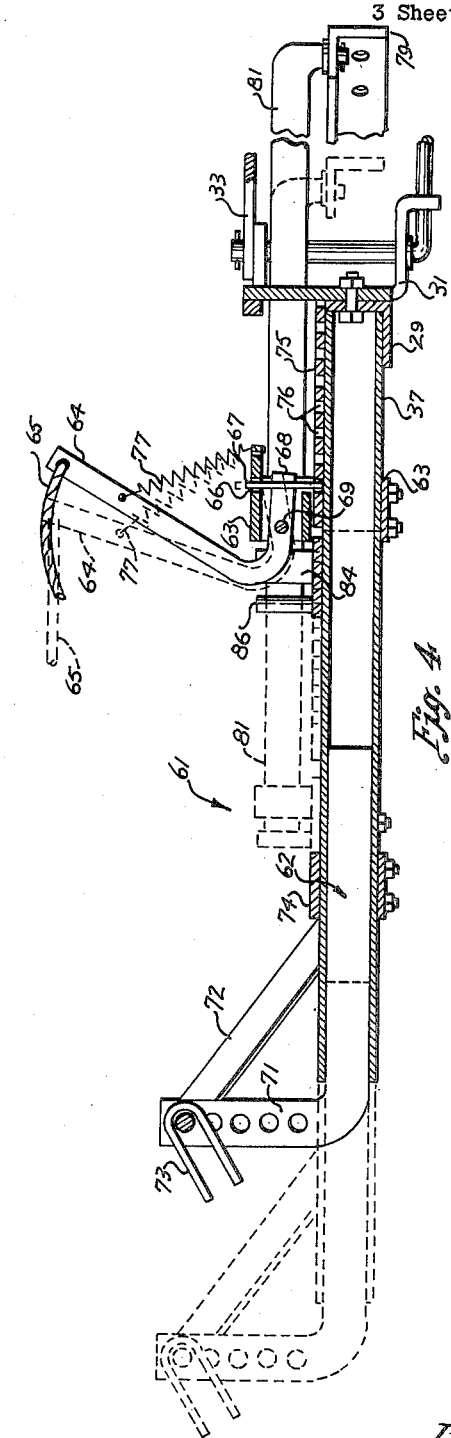
Inventor
ALEXANDER K. McKECHNIE
By: Fetherstonhaugh & Co.
Att'ys.

United States Patent Office 2,694,889
Patented Nov. 23, 1954

2,694,889

DISK HARROW

Alexander K. McKechnie, Orillia, Ontario, Canada, assignor to Autotrac Limited, Orillia, Ontario, Canada, a corporation of Canada Application August 24, 1950, Serial No. 181,201

2 Claims. (Cl. 55—83)

This invention relates to a tandem disk harrow.

The tandem type of disk harrow with which the present invention is concerned is of that general class having front and rear gangs of disks wherein the front gang comprises a pair of gang frames, each of which mounts a series of harrow disks, the frames being placed substantially end to end transversely of the desired path of movement of the harrow. The disks of the forward gangs are positioned to throw the earth outwardly from the centre line passing between them along the path of movement. The rear gangs are similarly constructed but have their disks disposed to urge the earth inwardly toward the centre line. The frames of the front and rear gangs are interconnected so that adjustment of each of the frames of the front gang to a position inclined with respect to the centre line likewise causes a corresponding angularity in the rear gang frames. However, by reason of the disposition of the disks in the rear gang frames as compared with the front gang frames, the latter will incline rearwardly toward the centre line, whereas the rear gang frames will incline forwardly toward the centre line.

In these inclined positions of the frames, the disk harrow is in the "cut" position, whereas when the front and rear frames are aligned with one another such that the disk blades are parallel to the said centre line then the blades ride over the ground surface and the harrow is said to be in the "no cut" position.

It has been found that in such constructions of tandem disk harrows there is a definite tendency for the rear gang frames to separate while the harrow is being drawn over the ground surface in the "cut" position. Attempts have previously been made to control such separation by rigidifying the inter-connection between the front and rear gangs. In spite of such previous attempts, relative movement between the rear gang frames has taken place, resulting in a ridge being formed along the centre line of the path of movement of the harrow. Accordingly, it is general practice for the operator to take a second pass over the ground surface with a harrow of previous construction.

The adjustment of prior constructions of tandem disk harrows has required the operator to dismount from the drawing vehicle and make a complicated series of adjustments to determine the degree of "cut" according to the nature of the ground surface, that is, whether it is hard or soft. Accordingly, it is usually necessary with such prior devices to make a number of adjustments which are exceedingly time-consuming.

Accordingly, it is the main object of the present invention to provide a special design of draw-bar for a tandem disk harrow embodying a sliding tongue and a fixed tongue and locking means associated therewith which may be actuated by the operator from his operating position on the drawing vehicle and by means of which the tandem disk harrow may be adjusted for the desired degree of "cut" by moving the vehicle while the harrow is in a position of rest.

It is also an object of the present invention to provide a draw-bar construction for a tandem disk harrow as before, which may be driven out of the "cutting" position by merely releasing the locking device as the vehicle and harrow are moving over the ground surface.

A further object of the invention is to provide a retaining yoke extending between the rear gang frames of a tandem disk harrow positively to limit relative movement therebetween and whereby ridging is avoided along the centre line of the path of movement of the harrow, and a second pass over the ground surface is thus obviated.

Other objects of the invention will be appreciated by a study of the following specification taken in conjunction with the accompanying drawings.

In the drawings:

Figure 3 is a detailed plan view of the draw-bar for the tandem disk harrow showing the intermediate position where the sliding tongue and fixed tongue are in the telescoped position corresponding to Figure 2, and the adjusting rods in the position corresponding to Figure 1 with the disks in the "no cut" position;

Figure 4 is an enlarged sectional view of the draw-bar construction of the invention on the line 4—4 of Figure 2.

Figure 1:
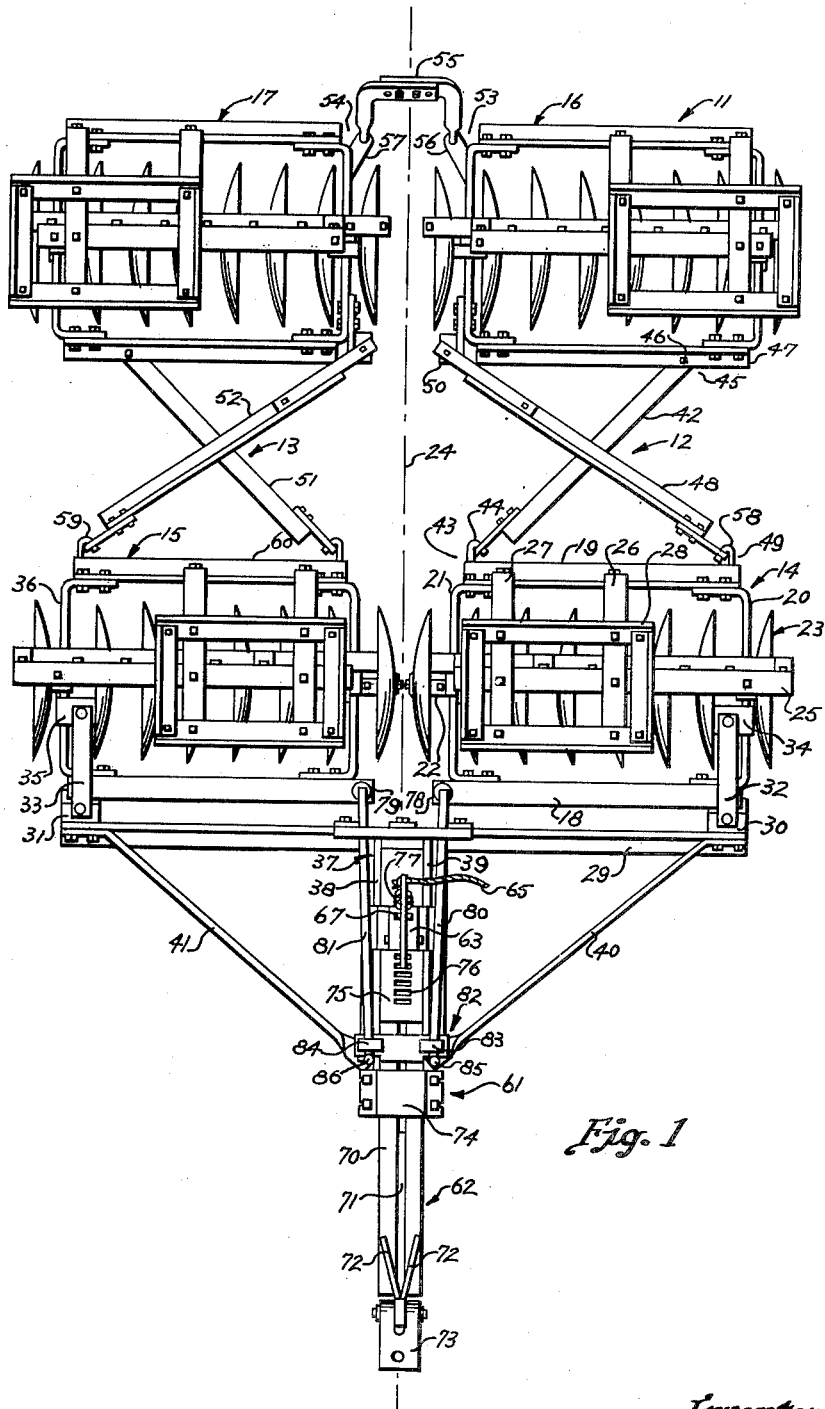
Figure 1 is a plan view of a tandem disk harrow according to the invention showing the same in the "no cut" position.
Figure 2:
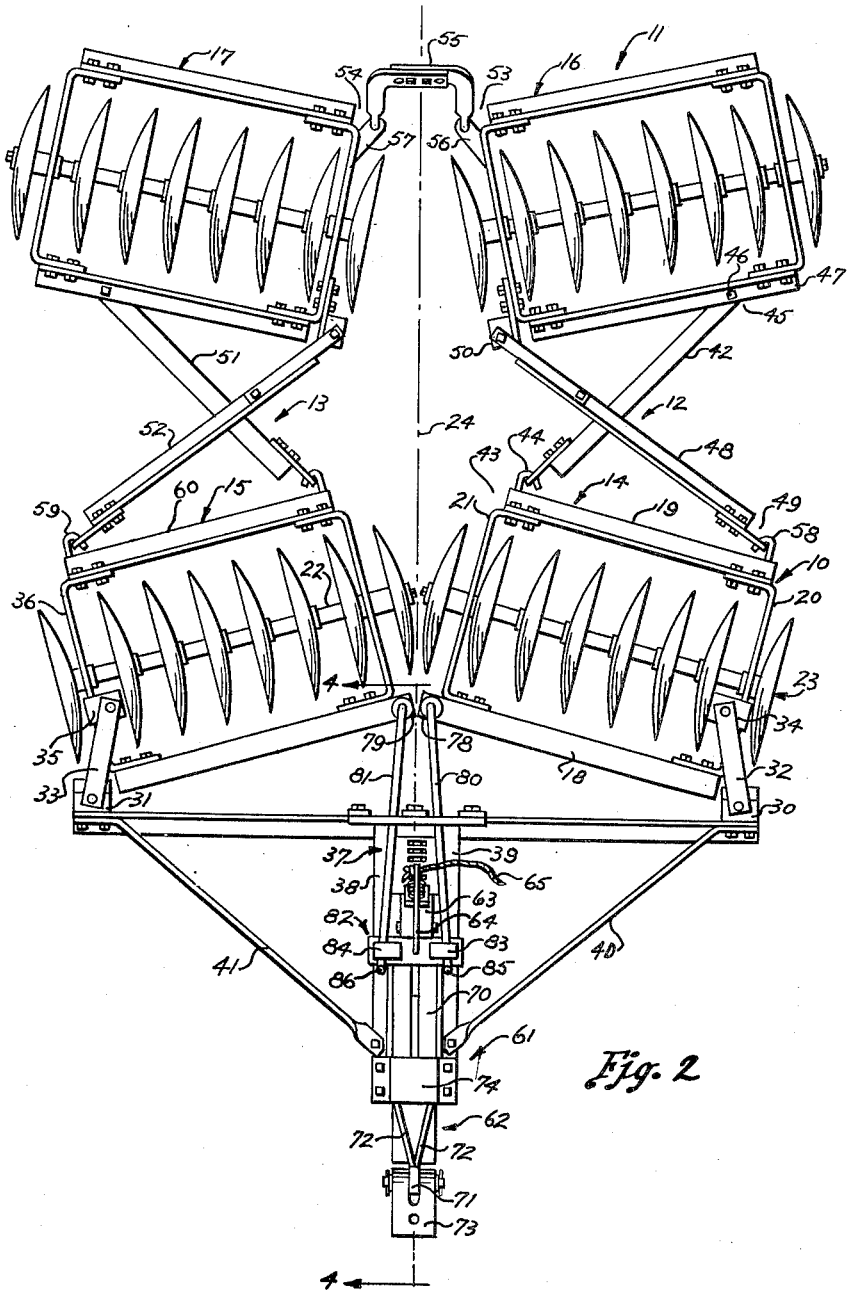
Figure 2 is a further plan view of the tandem disk harrow of the invention showing the same in the "cut" position.

Referring in more detail to the drawings, and particularly to Figures 1 and 2, the tandem disk harrow of the invention comprises the front gang 10 and rear gang 11 having inter-connecting means 12 and 13 which serve to inter-connect the front gang disk frames 14 and 15 to the rear gang disk frames 16 and 17 respectively. All of the frames are of similar construction. Thus, the frame 14 comprises front and rear angle pieces 18 and 19 joined at their ends by the end brackets 20 and 21 which latter mount a through shaft 22 supported in suitable bearings and carrying a series of disks 23 which are designed to move the earth outwardly from the centre line 24 of the path of movement of the harrow with the ground surface.

A cross-piece 25 is supported above the disks by suitable straps 26 and 27 and may carry a weight-pan 28 of any suitable construction and in which may be placed large stones or other weights to facilitate the "cutting" action of the disks as they pass over the ground surface. A cross-bar 29 carries brackets 30 and 31 at each end thereof which connect by suitable links 32 and 33 to brackets 34 and 35 on the end brackets 20 and 36 of the front gang frames 14 and 15. The cross-bar rigidly carries a fixed tongue 37 (see also Figure 3) extending therefrom along the centre line 24 and in the form of a pair of spaced apart angle members 38 and 39 connecting at their forward ends to the pole braces 40 and 41.

The inter-connecting means between the front and rear gangs may comprise a single transverse member 42 extending from an inner rearward point 43 of the frame 14 such as from the hook member 44 thereof to an outer but forward point 45 on the frame 11 such as at the bolt connection 46 on the angle-piece 47 of the latter frame. However, in order to avoid unwarranted tipping of, say, the rear frame 11 relative to the front gang frame 14 when passing over rolling ground it is desirable to include a cooperating cross member 48 extending from an outer rear point 49 of frame 14 to an inner forward point 50 of the frame 11. A similar transverse member 51 and cross member 52 may be employed between the frames 15 and 17.

According to the invention, however, the inward rear points 53 and 54 of the rear gang frames 16 and 17 are inter-connected by the adjustable yoke 55, the ends of which engage in brackets 56 and 57 extending from the respective frames at these points.

Accordingly, as the harrow is adjusted to the "cut" position illustrated in Figure 2 wherein the front gang frames are disposed at an acute angle relative to the centre line 24 and are directed inwardly and rearwardly toward the centre line, the rear gang frames are governed in their angularity the spacing between the points 53 and 54 as determined by the yoke 55. It should be appreciated in this connection that the cross members 48 and 52 are loosely connected particularly in the region of the hooks 58 and 59 on the rear angle pieces 19 and 60 of the front frames whereby the yoke 55 is allowed to determine the said angularity of the rear gang frames, the latter being directed forwardly toward the centre line 24 in the "cut" position.

It should be particularly observed that the adjustable yoke member 55 is disposed rearwardly of the axes of the disks of the rear gang frames and that the rear gang frames pivot about the arms of the yoke. Thus, when the harrow is moved to the "cut" position illustrated in Figure 2 the rear gang frames in pivoting about the arms of the yoke 55 move a lesser angle from the angle of 90° in the "no cut" position to the line of action 24 than do the front gang frames.

The draw-bar device 61 of the invention comprises the rigid tongue 37 and the slidable tongue 62 illustrated in more detail in Figures 3 and 4. The rigid tongue in the form of the spaced apart angles 38 and 39 carries a trip lever mounting bracket 63 which pivotally mounts the trip lever 64 to the free end of which may be connected an actuating cable 65 which may extend up to the position of the operator on the drawing vehicle. The trip lever mounting bracket 63 has an opening 66 serving as a guide for slidable passage of the latch dog plate 67, the latter being mounted on the lever arm 68 of the trip lever 64 inwardly of the pivot mounting pin 69 supporting the lever in the bracket 63.

The sliding tongue 62 is formed of a pair of angle members 70 set about the tongue post 71 (Figure 4) at the front end thereof having braces 72. The tongue post may carry a suitable hitching bracket 73 which is fastened to the drawing vehicle by any suitable means.

The sliding tongue rides between the spaced apart angle pieces 38 and 39 of the fixed tongue 37 and is supported therewithin and in the front portion of the latter by a guide bracket 74.

An adjusting plate 75 extends along the upper surface of the sliding tongue 62 and is welded thereto having a plurality of locking openings 76 into which the latch dog 67 may move for locking the sliding tongue in a position of adjustment relative to the fixed tongue. In this connection the trip lever 64 is normally biased by means of the tension spring 77 for locking engagement.

Referring also to Figures 1 and 2, it will be observed that the forward inner ends 78 and 79 of the frames 14 and 15 are connected by adjusting rods 80 and 81 to the sliding tongue 62 in a particular manner. Suitable one-way stop means 82 are provided on the sliding tongue 62 in the form of looped members 83 and 84 (Figures 1 and 2) which are designed to accommodate the adjusting rods 80 and 81 but will not allow passage therethrough of the enlargements 85 and 86 on the free ends of the adjusting rods.

In operation, therefore, the most outward extension of the sliding tongue in the fixed tongue of the draw-bar assembly causes the one-day stop means 82 to be positioned most forwardly with respect to the cross-bar 29 and hence as the harrow is drawn forward the adjusting rods will be drawn by the engagement of their enlargements 85 and 86 in the position illustrated in Figure 1 wherein the front gang frames are substantially parallel to the cross-bar 29.

If it is desired to place the harrow in the "cut" position, the drawing vehicle is stopped and the operator releases the latch dog 67 by drawing on the trip lever 64 and while holding the latch dog released, backs the vehicle toward the harrow to cause the sliding tongue to move within the fixed tongue a desired distance at which the trip lever is released to allow engagement of the latch dog. This position of the draw-bar components is illustrated in Figure 3. Until the drawing vehicle moves forward, the front and rear gangs will remain in the position illustrated in Figure 1 but as soon as forward movement of the vehicle takes place, the cross-bar will begin to draw the front gang by the end links 32 and 33. The inward front points 78 and 79 of the front angle pieces of the front gang frames 14 and 15 will remain substantially stationary until such time as the looped members 83 and 84 slidably moving forwardly over the adjusting rods 80 and 81 engage the enlargements 85 and 86 thereof respectively. At this time, the whole harrow will begin to move forward in the disposition of its components illustrated in Figure 2.

In order to release the harrow to the "no cut" position it is merely necessary for the operator to draw on the trip lever to release the latch dog 67 as the harrow is moving over the ground surface. As the latch dog is released, the forces drawing the harrow are directly transmitted from the slidable tongue through the adjusting rods 80 and 81 to the inner forward points 78 and 79 of the front gang frames 14 and 15. The cross-bar 29 and the fixed tongue will be free to move and, accordingly, the dragging effect of the disks in the gang frames will cause the latter to assume again the position illustrated in Figure 1, after which the operator may release the trip lever to cause engagement of the latch dog.

It is intended that the present disclosure should not be construed in any limiting sense other than that indicated by the scope of the following claims.

What I claim as my invention is:

1. In a tandem disk harrow including front and rear pairs of gang frames disk gangs mounted on the frames, the combination comprising: a cross-bar; a pair of laterally spaced front disk gang frames pivoted at their outward ends to said cross-bar; a pair of laterally spaced rear disk gang frames positioned in generally tandem relation to the front disk gang frames, each pair of tandem gangs having a diagonal member extending from the outward end of the rear disk gang frame to the inner end of the corresponding front gang frame and a second diagonally extending transverse member extending between the outer end of the front disk gang frames and the inner ends of the rear disk gang frames, and pivotally connected thereto; and a rigid laterally adjustable yoke member pivotally connected to and extending between the inner ends of the rear disk gang frames; the points of pivotal connection being substantially rearwardly of the transverse axes of the disks carried by said rear disk gang frames whereby to cause the angle of the rear disk gangs frames to be less than the angle of the front disk gang frames, when the disk gang frames are angled to operative position.

2. The combination in a tandem disk harrow as claimed in claim 1 and a draw bar device slidable relative to said cross-bar and transversely thereof in the direction of the desired line of movement of the disk harrow over the ground surface, means for locking said draw bar device against movement relative to said cross-bar; and a one way stop device on said slidable draw bar device including a pair of links slidable therethrough, each being connected at one end to the inner end of a front gang frame.

References Cited in the file of this patent

UNITED STATES PATENTS

| Number | Name | Date |
|---|---|---|
| 1,156,611 | Michael | Oct. 12, 1915 |
| 1,442,599 | Bohnker et al. | Jan. 16, 1923 |
| 1,798,899 | Paul | March 31, 1931 |
| 1,967,493 | Boda | July 24, 1934 |
| 2,538,594 | Rutter | Jan. 16, 1951 |